United States Patent [19]

van der Pol

[11] Patent Number: 5,381,697
[45] Date of Patent: Jan. 17, 1995

[54] MASS FLOW METER

[75] Inventor: Ronald van der Pol, Venlo, Netherlands

[73] Assignee: Krohne Messtechnik GmbH & Co., KG, Germany

[21] Appl. No.: 87,455

[22] Filed: Jul. 6, 1993

[30] Foreign Application Priority Data

Jul. 6, 1992 [DE] Germany .................... 4222095

[51] Int. Cl.⁶ ............................................. G01F 1/84
[52] U.S. Cl. ................................................ 73/861.37
[58] Field of Search ............. 73/861.37, 861.38, 32 A, 73/861.01

[56] References Cited

U.S. PATENT DOCUMENTS 4,491,009 1/1985 Ruesch .................... 73/32 A
4,768,384 9/1988 Flecken et al. ............. 73/861.38

FOREIGN PATENT DOCUMENTS 3632800 7/1988 Germany .
4124295 1/1993 Germany .
0261435 3/1988 European Pat. Off. .
0306110 3/1989 European Pat. Off. .

OTHER PUBLICATIONS

R. Boll und G. Hinz, Sensoren aus Amorphen Metallen, Technische Messen tm, 52, Jahrgang, Heft May 1985.
Von W. Steffen und Dr. W. Stumm, Direkte Massedurchflussmessung Insbesondere mit Corioliserfahren, Messen Profen Aut. (1987).

Primary Examiner—Richard E. Chilcot, Jr.
Assistant Examiner—Harshad Patel
Attorney, Agent, or Firm—Cesarei and McKenna

[57] ABSTRACT

A mass flow meter for flowing media which works on the Coriolis Principle includes a straight measuring pipe carrying the flow medium, an oscillator acting on the measuring pipe and two transducers detecting Coriolis forces and/or Coriolis oscillations based on Coriolis forces. The meter also has a carrier pipe holding the measuring pipe, the oscillator and the transducers and two temperature sensors that detect the temperature of the measuring pipe and correct the measured value depending on the temperature of the measuring pipe. The measuring pipe and the carrier pipe are connected to one another in a way that excludes relative axial movements, and the axial distance between the connecting points of the measuring pipe carrier pipe represents the oscillation length of the measuring pipe. The mass flow meter is designed so that, in a simple way, the measured value is largely independent from temperature changes and from forces acting from the outside and so that a length-change sensor that detects changes in the oscillation length of the measuring pipe can correct the measured value depending on the oscillation length of and stress on the measuring pipe.

68 Claims, 4 Drawing Sheets

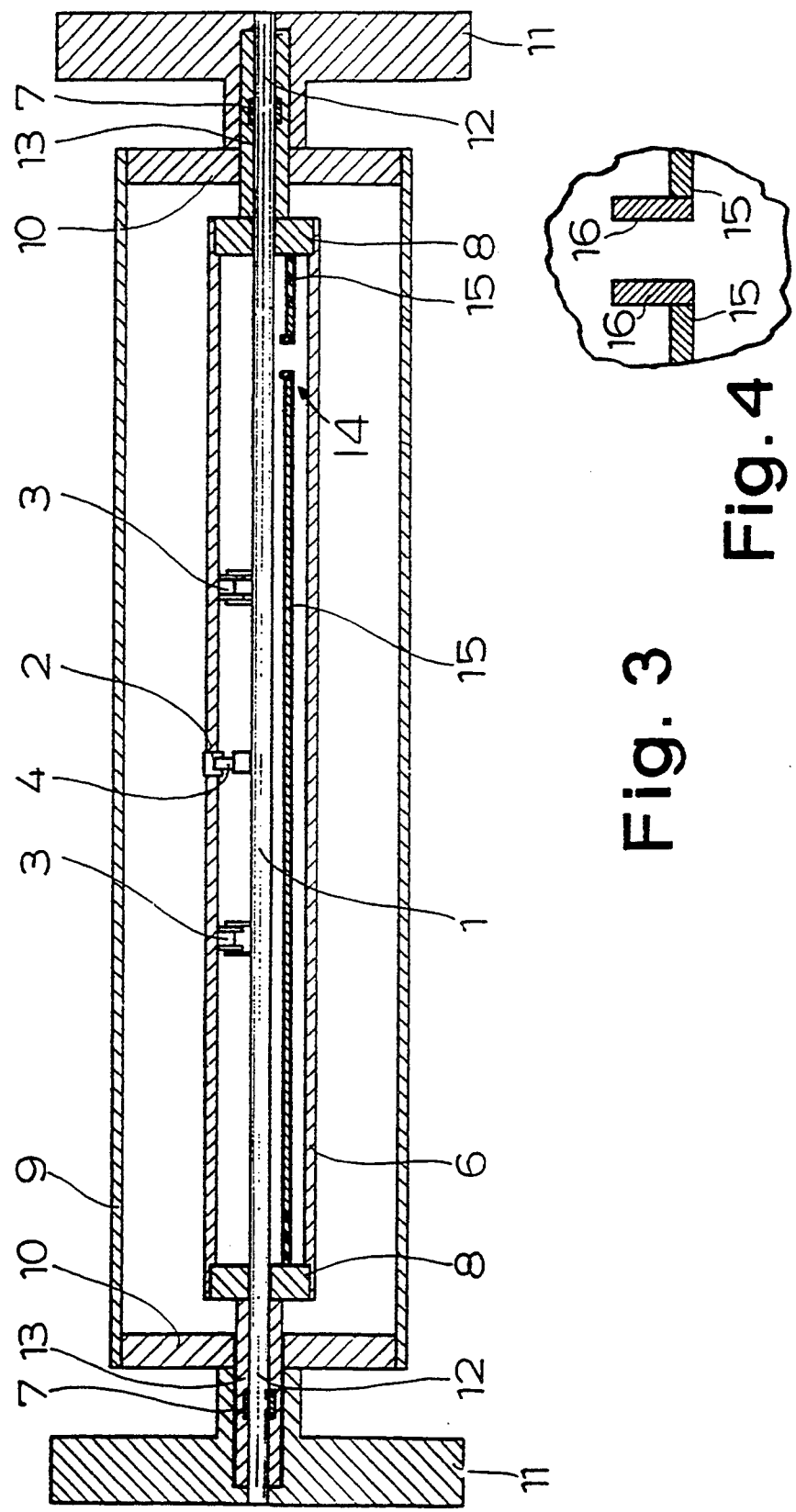

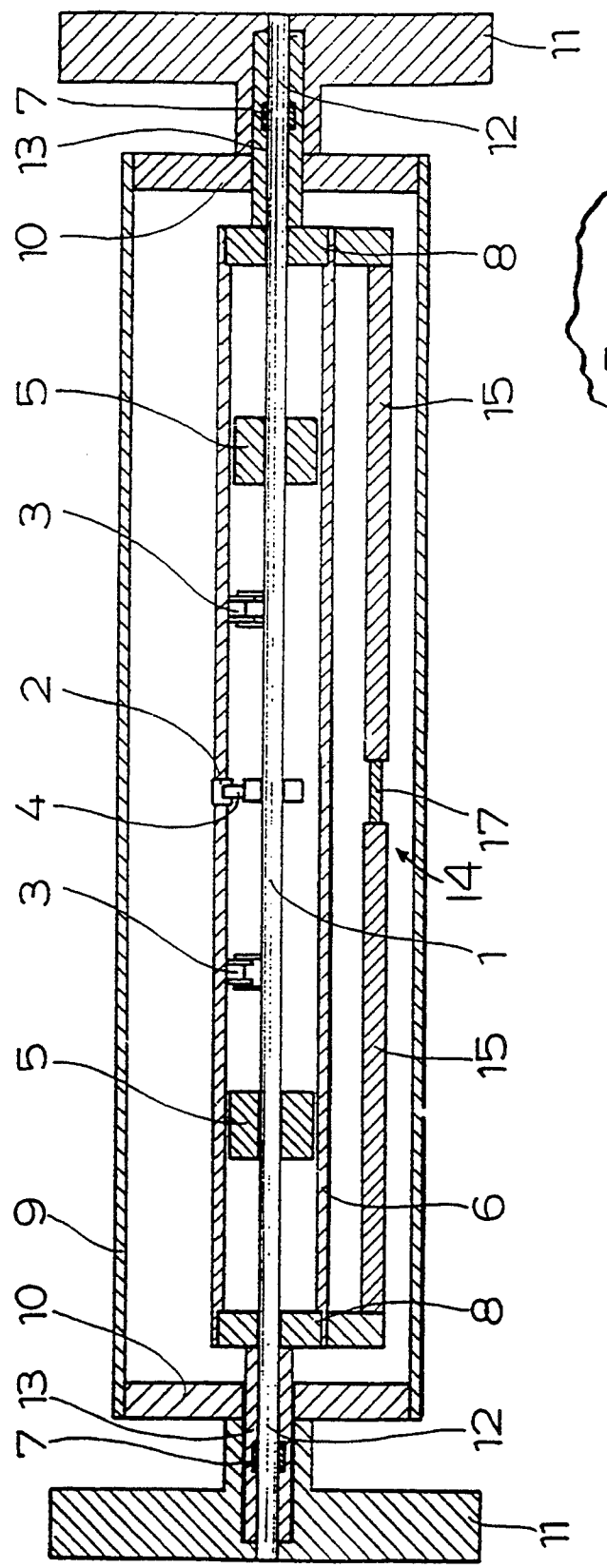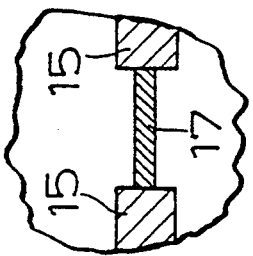

MASS FLOW METER

The invention concerns a mass flow meter for flowing media that works on the Coriolis Principle, with at least one straight measuring pipe carrying the flowing medium, at least one oscillator acting on the measuring pipe, at least one transducer detecting Coriolis forces and/or Coriolis oscillations based on Coriolis forces, one carrier pipe that holds the measuring pipe, the oscillator and the transducer, and at least one temperature sensor that detects the temperature of the measuring pipe to correct the measured value depending on the temperature of the measuring pipe, wherein the measuring pipe and the carrier pipe are connected to one another in a way that excludes relative axial movements, and the axial distance between the points connecting the measuring pipe and the carrier pipe represents the oscillation length of the measuring pipe.

BACKGROUND OF THE INVENTION

Mass flow meters for flowing media that work on the Coriolis Principle are known in various embodiments (see, for example, German Disclosure Documents 26 29 833, 28 22 087, 28 33 037, 29 38 498, 30 07 361, 33 29 544, 34 43 234, 35 03 841, 35 05 166, 35 26 297, 36 32 800, 37 07 777, 39 16 285, 40 16 907, 41 24 295, 41 24 296 and 41 29 181, European Patent Disclosure Documents 0 083 144, 0 109 218, 0 119 638, 0 196 150, 0 210 308, 0 212 782, 0 235 274, 0 239 679, 0 243 468, 0 244 692, 0 261 435, 0 271 605, 0 275 367 and 0 282 552, as well as U.S. Pat. Nos. 4,491,009, 4,628,744, and 4,660,421) and are increasingly being used in practice.

Mass flow meters for flowing media that work on the Coriolis Principle are basically divided into those whose measuring pipes are designed to be at least basically straight, and those whose measuring pipes are designed to be loop-shaped. The mass flow meters in question are also divided into those with only one measuring pipe and those with two; in designs with two measuring pipes, the pipes may be fluidically in series or in parallel.

Embodiments of mass flow meters in which the measuring pipe or pipes are designed to be straight are simple in mechanical design and consequently can be produced at relatively low cost. Moreover, the inner surfaces of the pipe are easy to work on, for example, to polish and they have low pressure losses.

The disadvantage of mass flow meters that work on the Coriolis Principle and in which the measuring pipe or pipes is designed to be straight is that both thermally caused changes in length and thermally caused stresses and also forces and torques working from those outside can lead to measurement errors and to mechanical damage, namely to stress cracks.

Experts have already dealt with the measurement errors that occur due to temperature changes in mass flow meters that work on the Coriolis Principle.

First of all, it has already been recognized that the temperature dependence of the modulus of elasticity influences the oscillation frequency and the elasticity of the measuring pipe and thus the measured value; the result is that a temperature sensor is often provided that detects the temperature of the measuring pipe to correct the measured value depending on the temperature of the measuring pipe; see, for example, in the German publication "Messen Prüfen Automatisieren", 1987, Vol. 23, No. 5, Pages 301 through 305, the essay Direkte Massendurchflussmessung, insbesondere mit Coriolisverfahren" by von W. Steffen und Dr. W. Stumm.

Incidentally, with a mass flow meter of the type described at the outset, the extensive temperature dependence of the measured value was taken into account in that a temperature sensor is provided to detect the temperature of the carrier pipe to correct the measured value, depending on the temperature of the carrier pipe (see German Disclosure Document 36 32 800 and the corresponding European Disclosure Document 0 261 435). Here, temperature sensor signals produced by the two temperature sensors (one for the measuring pipe and one for the carrier pipe) are put into a correction circuit that should eliminate the influence of temperature on the measured value. Specifically, provision is made for the correction circuit to multiply the measured value by a correction factor $K = K_0 + K_1 T_1 + K_2 T_2 + K_3 T_1^2 + K_4 T_2^2 + K_5 T_1 T_2$, wherein $T_1$ is the temperature of the measuring pipe, $T_2$ is the temperature of the carrier pipe and $K_0$, $K_1$, $K_2$ $K_3$, $K_4$ and $K_5$ are constant coefficients that are specific for a certain embodiment of the mass flow meter.

In practice, it was shown that the higher order terms of the above expression can be ignored, so that temperature compensation is attained with sufficient precision if the uncorrected measured value is multiplied by the correction factor $K = K_0 + K_1 T_1 + K_2 T_2$. In the known mass flow meter described above, the temperatures of the measuring pipe and the carrier pipe—more or less as the external cause of a temperature-dependent measurement error—are considered correcting; the internal causes resulting from these external causes have not yet been addressed, however.

Finally, a mass flow meter working on the Coriolis Principle is known that, like the mass flow meter from which the invention comes, has a straight measuring pipe carrying the flowing medium, an oscillator acting on the measuring pipe, two measurement transducers that detect Coriolis oscillations based on Coriolis forces and a carrier pipe for the measuring pipe, the oscillator and the transducers, but in which there is no temperature sensor to detect the temperature of the measuring pipe, but where, in another way, care is taken that the measured value is largely non-temperature-dependent, and temperature changes thus do not lead to measurement errors to a considerable extent (see German Disclosure Document 41 24 295 and corresponding U.S. application Ser. No. 07/917,577, infra). In this mass flow meter, the carrier pipe is designed as a so-called compensation cylinder, through which or in connection with which temperature changes—as well as forces and torques acting from the outside—are compensated or at least their effects are largely eliminated. The structural unit of the measuring pipe and the carrier pipe designed as a compensation cylinder is more or less "immune" to temperature changes, and to forces and torques acting from the outside.

Thus, additional measures to "immunize" the cylinder from temperature changes and forces and torques acting from the outside are taken. An initial additional measure of this kind consists of the fact that the measuring pipe is arranged inside the carrier pipe with tensile prestress. As the temperature increases, the tensile prestress decreases. A second extra measure to "immunize" the cylinder consists of using materials for the measuring pipe and the carrier pipe with the same or almost the same heat expansion coefficients, especially materials with relatively low heat expansion coefficients. For further details on this known mass flow meter, please refer expressly to the contents of German Disclosure Document 41 24 295 and corresponding U.S. application Ser. No. 07/917,577, filed Jul. 21, 1992, the contents of which are hereby incorporated by reference herein.

SUMMARY OF THE INVENTION

Proceeding from the state of the art explained above in detail, the invention is now based on the task of designing and developing the mass flow meter described at the beginning so that the measured value is largely independent of temperature changes and forces acting from the outside in a simple way.

The mass flow meter of the invention, in which the task derived and presented previously is solved, is now characterized first of all basically by the fact that it has a length-change sensor that detects changes in the oscillation length of the measuring pipe to correct the measured value depending on the oscillation length of and the stresses on the measuring pipe.

In the mass flow meter in the invention, on one hand, temperature changes in the measuring pipe, and on the other hand, length changes in the measuring pipe, and even changes in the oscillation length of the measuring pipe that influence the measured value are used to correct the measured value. Thus, both measurement errors based on temperature changes in the measuring pipe and the carrier pipe and also such measurement errors that result from forces acting from the outside are eliminated. This is based on the following: in mass flow meters of the type in question, the measured value—obtained from the transducer signals by an evaluation circuit—is primarily dependent on the oscillation frequency of the measuring pipe. The oscillation frequency of the measuring pipe is, in turn, dependent on—i.e., temperature-dependent—the modulus of elasticity of the measuring pipe, the effective oscillating length, the so-called oscillation length of the measuring pipe, and the axial stress on the measuring pipe. The oscillation frequency of the measuring pipe is thus only indirectly dependent on the temperature of the carrier pipe and the forces working on the carrier pipe from the outside, namely only due to the fact that the oscillation length and/or the axial stress condition of the measuring pipe is changed thereby.

Due to the fact that the mass flow meter of the invention, first of all, like the state of the art as well, has a temperature sensor that detects the temperature of the measuring pipe to correct the measured value, depending on the temperature of the measuring pipe, the influence of the temperature-dependent change in the modulus of elasticity on the oscillation frequency of the measuring pipe can be considered and a measurement error resulting therefrom can be practically completely eliminated.

Due to the fact that, now, according to the invention, in addition to the temperature sensor that detects the temperature of the measuring pipe, there is a length-change sensor that detects changes in the oscillation length of the measuring pipe, the changes in oscillation length influencing the oscillation frequency of the measuring pipe and the axial stress on the measuring pipe can be considered, and measurement errors resulting therefrom can be eliminated—and this is especially important—including both those errors that are based on the temperature changes in the measuring pipe and/or the carrier pipe and also those that are based on forces that act on the measuring pipe and/or the carrier pipe from the outside. Thus, length-change sensor signals given off by the length-change sensor are, naturally, a direct measurement of changes in the oscillation length of the measuring pipe, regardless of what these changes are based on, and an indirect measurement of changes in the axial stress on the measuring pipe, in turn, regardless of what these changes are based on.

The fact that a change in the axial stress on the measuring pipe can be determined from a change in the oscillation length of the measuring pipe results from the fact that a change in the axial stress on the measuring pipe is linearly dependent on a change in the oscillation length of the measuring pipe. The length-change sensor provided according to the invention, which detects changes in the oscillation length of the measuring pipe, thus provides the possibility of practically completely eliminating changes in the oscillation length of the measuring pipe and changes in the axial stress on the measuring pipe—and thus measurement errors based on them—in determining the measurement value. What the mass flow meter in the invention therefore does is make sure that all influences changing the oscillating frequency of the measuring pipe are considered so that all measurement errors resulting therefrom can be practically completely eliminated.

Now, individually, there are a large number of possibilities of designing and developing the mass flow meter according to the invention, which applies especially to the design of the length-change sensor. For this, please refer to the patent claims subordinated to claim 1, on one hand, and, on the other hand, to the following description of the preferred embodiments.

BRIEF DESCRIPTION OF THE DRAWINGS

For a fuller understanding of the nature and objects of the invention, reference should be had to the following detailed description taken in connection with the accompanying drawings, in which:

FIG. 3 is a similar view of a third embodiment of a mass flow meter according to the invention;

FIG. 4 is a fragmentary sectional view on a larger scale of a part of the FIG. 3 flow meter;

FIG. 5 is a longitudinal sectional view of a fourth embodiment of a mass flow meter according to the invention, and FIG. 6 is a view similar to FIG. 4 of a part of the FIG. 5 flow meter.

DETAILED DESCRIPTION OF ILLUSTRATIVE EMBODIMENTS

The mass flow meter for flowing media according to the invention is one that works on the Coriolis Principle. Consequently, it has a straight Coriolis pipeline 1 carrying the flowing medium, an oscillator 2 acting on the Coriolis pipeline 1 and two transducers 3 for detecting Coriolis forces and/or Coriolis oscillations based on Coriolis forces. In the embodiment shown specifically in FIG. 1, the oscillator 2 works with a pendulum arm 4 provided on the Coriolis pipeline 1 as described in U.S. application Ser. No. 07/736,400, filed Jul. 26, 1991, the contents of which are hereby incorporated by reference herein.

Figure 1:
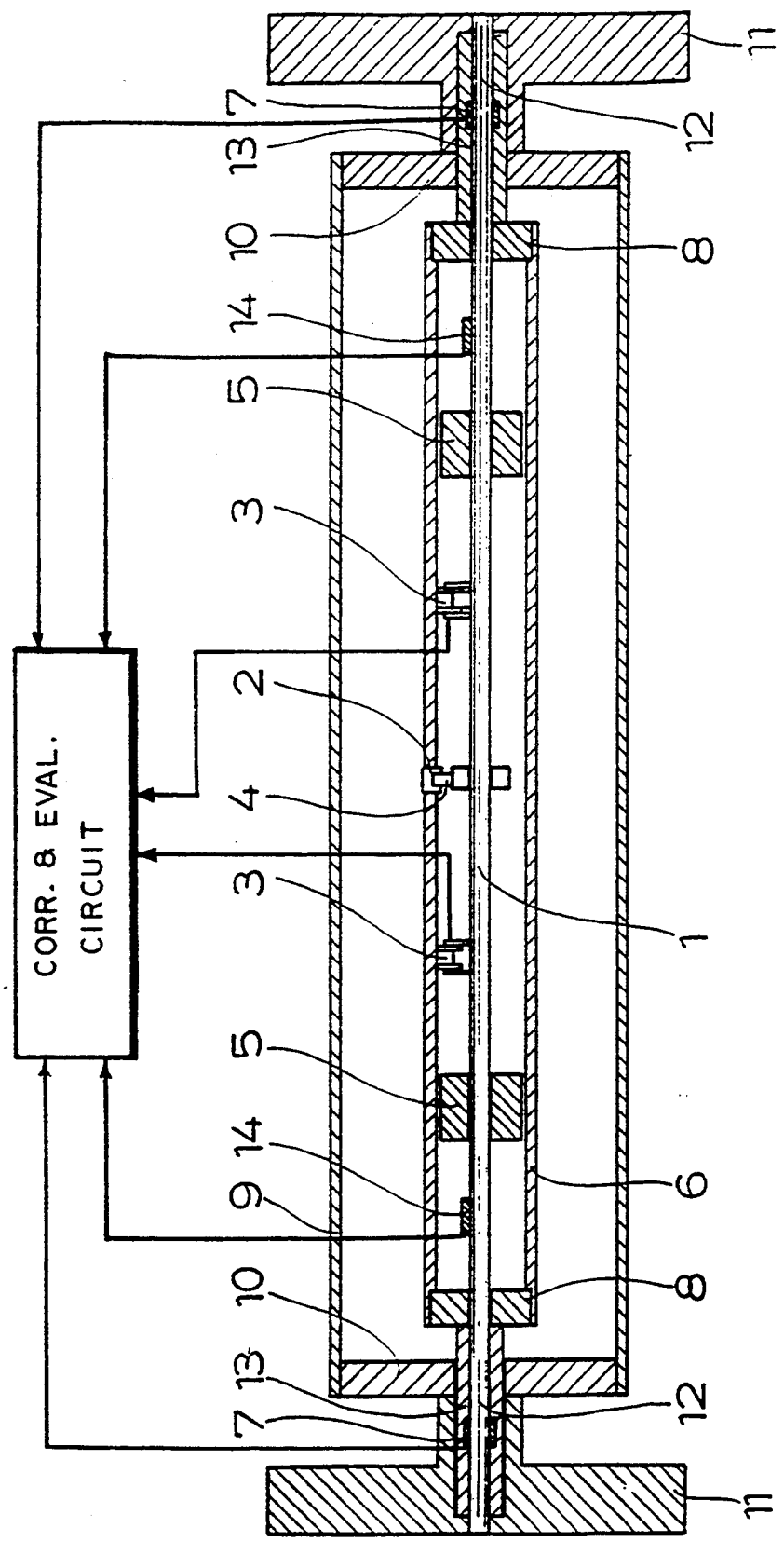
FIG. 1 is a longitudinal sectional view of one embodiment of a mass flow meter according to the invention.
Figure 2:
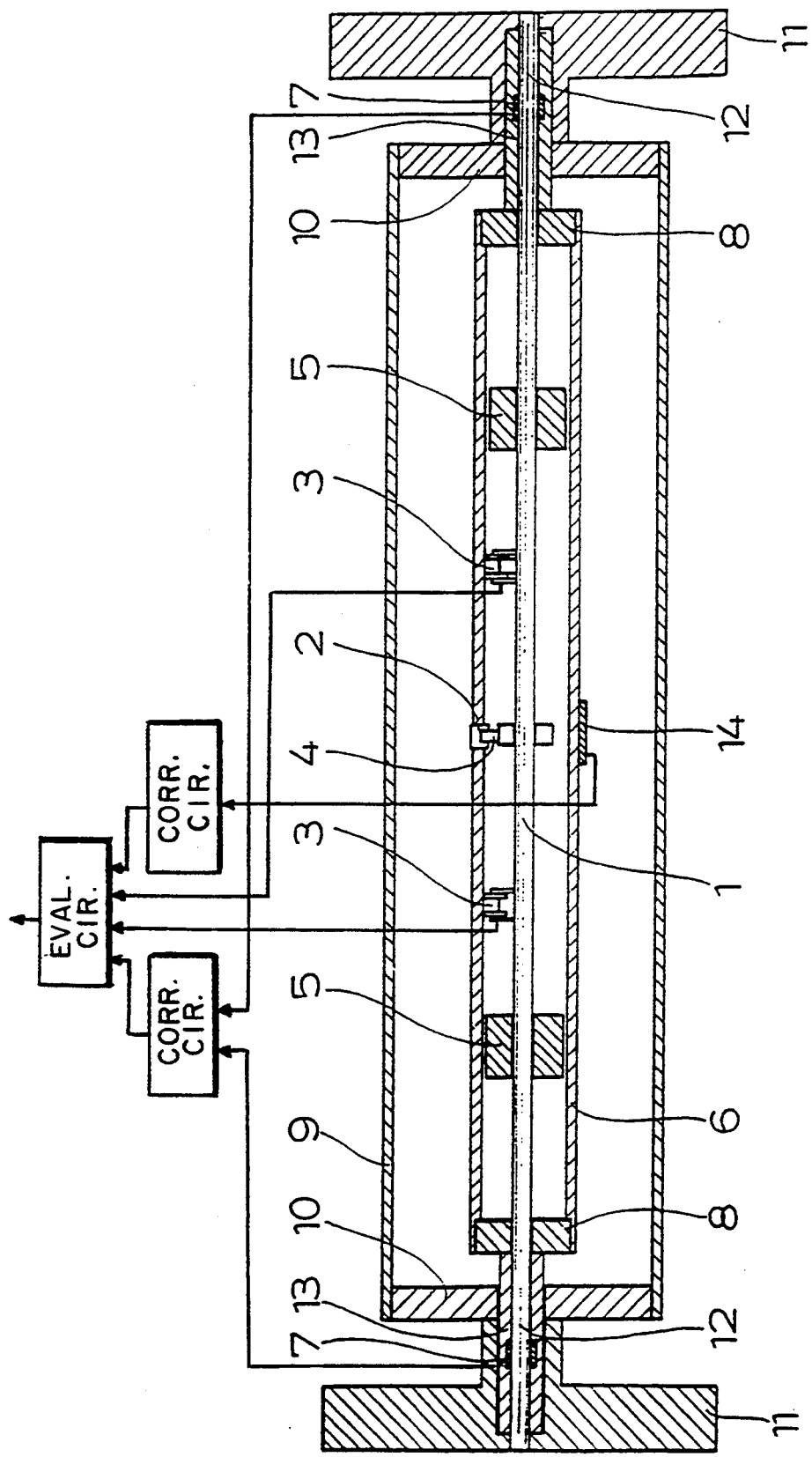
FIG. 2 is a similar view of a second embodiment of a mass flow meter according to the invention.

In addition, FIGS. 1, 2 and 4 show that the measuring pipe 1 is provided with solid bodies 5, through whose mass and arrangement along the pipe the inherent frequency of the measuring pipe 1 can be influenced within certain limits.

For the mass flow meter from which the invention proceeds and the mass flow meter of the invention, and for all disclosed embodiments of the mass flow meter of the invention, it is also true that there is a carrier pipe 6 that holds the measuring pipe 1, the oscillator 2, the transducers 3 and the solid bodies 5, if there are any, and at least one temperature sensor 7 that detects the temperature of the measuring pipe 1, wherein the measuring pipe 1 and the carrier pipe 6 are connected to one another in a way that excludes relative axial movement and the axial distance between the connection points of the measuring pipe 1 and carrier pipe 6 represents the oscillation length of the measuring pipe 1, and wherein the temperature sensor 7 that detects the temperature of the measuring pipe 1 is used to correct the measured value, depending on the temperature of the measuring pipe.

In all embodiments of the mass flow meter of the invention shown, the measuring pipe 1 is connected to the carrier pipe 6 via two connecting rings 8 mounted to the ends of the carrier pipe 6. There is also an outer cylinder 9 which holds the unit consisting of the measuring pipe 1, the oscillator 2, the transducers 3, and pendulum arm 4, the mass bodies 5, if there are any, the carrier pipe 6 and the connecting rings 8. And the cylinder 9 has two connecting rings 10 mounted to its ends, to which connecting flanges 11 projecting to the outside are connected. Pipes 12 connected to the measuring pipe 1 project through the connecting rings 10 into the connecting flanges 11. For this purpose, the measuring pipe 1 and the connecting pipe 12 are preferably made in one piece; in this way, there is a fully continuous pipe. To protect the connecting pipe 12, it is encased in a reinforcing cylinder 13.

For more information concerning the measuring pipe 1, the carrier pipe 6, the connecting rings 8, and outer cylinder 9, the connecting rings 10, the connecting flange 11, the connecting pipe 12 and the reinforcing cylinder 13 and concerning the connection of these components to one another, refer to the above-mentioned U.S. application Ser. No. 07/917,577.

According to the invention, a length-change sensor 14 that detects changes in the oscillation length of the measuring pipe 1 is provided for correcting the measured value depending on the oscillation length of and the stress on the measuring pipe. The fact that, and the extent to which, all the oscillation influences changing the oscillation frequency of the measuring pipe are considered and thus all measurement errors resulting therefrom can be practically completely eliminated has already been described in detail.

The drawing figures do not show how the temperature sensor signals from the temperature sensor 7 and the length-change sensor signals from the length-change sensor 14 are produced. There are many ways of doing this. One way is to put the temperature sensor signals produced by the temperature sensor 7 into a first correction circuit and length-change sensor signals produced by length-change sensor 14 into a second correction circuit and apply the correction signals from both correction circuits to an evaluation circuit to correct the measured value obtained from the transducer 3 signals. It is also possible to apply the temperature sensor signals produced by the temperature sensor 7 and the length-change sensor signals produced by the length-change sensor 14 to a single correction circuit and have the correction signal from the correction circuit, in an evaluation circuit, correct the measured value obtained from the transducer 3 signals. Still another possibility is to apply the temperature sensor signals from the temperature sensor 7 and the length-change sensor signals from the length-change sensor 14 to a correction and evaluation circuit and there correct the measured value obtained from the measured value sensor signals.

Suitable correction and evaluation circuits for deriving from the temperature sensor signals suitable correction signals for evaluation and correction of the measured value obtained from the transducer signals are described in German disclosure document 36 32 800 and the corresponding European disclosure document 0 261 435 identified as prior art at the outset and hereby incorporated by reference herein. See also U.S. Pat. No. 4,491,009.

As already stated, there are various possibilities, especially regarding the construction of the length-change sensor 14; some of those individual possibilities are realized in the mass flow meter embodiments shown in the drawing figures.

In the embodiments shown in FIGS. 1 and 2, each length-change sensor 14 is designed as a strain gage. In the embodiment in FIG. 1, a pair of length-change sensors 14 is placed on the measuring pipe 1. Since the measuring pipe 1 and the carrier pipe 6 are connected to one another in a way that excludes relative axial movements, the length-change sensor 14, designed as a strain gage, can also be placed on the carrier pipe 6 as shown in FIG. 2.

In the embodiments of the mass flow meter that are shown in FIGS. 3 (with FIG. 4) and 5 (with FIG. 6), the length-change sensor 14 comprises two length-change detector rods 15 that are made of a material such as invar with an especially low thermal expansion coefficient. The low expansion coefficient leads to the fact that temperature-dependent length changes in the length-change detector rods 15 have practically no influence on the measurement of changes in the oscillation length of the measuring pipe 1. Also, in this embodiment of the length-change sensor, the sensor can be produced inside the carrier pipe 6 as shown in FIG. 3, or outside the carrier pipe 6 as shown in FIG. 5.

As shown in detail in FIG. 4, in the meter embodiment in FIG. 3, the ends of the axially aligned length-change detector rods 15 face one another and carry spaced apart capacitor plates 16. In this example, a length change is thus measured via a change in capacitance of that capacitor. On the other hand, FIG. 6 shows for the FIG. 5 meter embodiment that connected between the ends of the length-change detector rods 15 which face one another, there is a strain gage 17. In this embodiment, then, a length change is reflected by a change in resistance of the strain gage 17.

Any known means may be provided for measuring the change in capacitance or resistance of the sensors 14 depicted in FIGS. 3 and 5.

In conclusion, it should be pointed out that in all embodiments of the mass flow meter according to the invention shown, two temperature sensors 7 designed as temperature-dependent resistors, preferably Pt-1000, are provided, and they are on the connecting pipes 12 on both sides of the measuring pipe 1. When the temperature at the input end of the measuring pipe 1 is different from the temperature at the output end of the measuring pipe 1, this gives average temperature of the measuring pipe 1. Both temperature sensors 7 are connected in series so that only two external connections are needed to process the temperature sensor signals produced by the two temperature sensors.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention described herein.

I claim:

1. A mass flow meter for flowing media that works on the Coriolis Principle, with a substantially straight measuring pipe carrying the flowing medium, at least one oscillator acting on the measuring pipe, means including at least one transducer detecting either one or both Coriolis forces and Coriolis oscillations based on Coriolis forces and producing a measured value of the mass flow, a carrier pipe that holds said measuring pipe, said oscillator and said transducer and at least one temperature sensor that detects the temperature of the measuring pipe to correct the measured value depending on the temperature of the measuring pipe, wherein the measuring pipe and the carrier pipe are connected to one another in a way that excludes relative axial movements, and the axial distance between the points connecting the measuring pipe and the carrier pipe corresponds to the oscillation length of the measuring pipe, characterized by the fact that a length-change sensor that detects changes in the oscillation length of the measuring pipe is provided for correcting the measured value depending on said oscillation length of and the stress on the measuring pipe.

2. The mass flow meter according to claim 1, wherein said temperature sensor produces temperature signals and said length-change sensor produces length-change signals, and further including first and second correction circuits for receiving said temperature and length-change signals, respectively, and producing first and second correction signals and an evaluation circuit responsive to the first and second correction signals for correcting said measured value.

3. The mass flow meter according to claim 1 wherein said temperature sensor produces temperature signals and said length-change sensor produces length-change signals, and further including a correction circuit responsive to said temperature signals and said length-change signals for producing correction signals and an evaluation circuit responsive to the correction signals for correcting said measured value.

4. The mass flow meter according to claim 1 wherein said temperature sensor produces temperature sensor signals and said length-change sensor produces length-change sensor signals, and further including a correction and evaluation circuit responsive to the temperature signals and the length-change signals for correcting said measured value.

5. The mass flow meter according to any one of claims 1 to 4 wherein the length-change sensor comprises at least one strain gage.

6. The mass flow meter according to claim 5, wherein the strain gage is placed on the measuring pipe.

7. The mass flow meter according to claim 5, wherein the strain gage is placed on the carrier pipe.

8. The mass flow meter according to any one of claims 1 to 4, wherein the length-change sensor comprises at least one length-change detector rod.

9. The mass flow meter according to claim 8 wherein said at least one length-change detector rod is of a material with a low thermal expansion coefficient.

10. The mass flow meter according to claim 8 wherein the length-change sensor is located inside the carrier pipe.

11. The mass flow meter according to claim 9 wherein the length-change sensor is located inside the carrier pipe.

12. The mass flow meter according to claim 8 wherein the length-change sensor is located outside the carrier pipe.

13. The mass flow meter according to claim 9 wherein the length-change sensor is located outside the carrier pipe.

14. The mass flow meter according to claim 8 wherein the length-change sensor comprises axially aligned length-change detector rods and a pair of spaced-apart capacitor plates mounted to the adjacent ends of said rods and facing one another.

15. The mass flow meter according to claim 9 wherein the length-change sensor comprises axially aligned length-change detector rods and a pair of spaced-apart capacitor plates mounted to the adjacent ends of said rods and facing one another.

16. The mass flow meter according to claim 10 wherein the length-change sensor comprises axially aligned length-change detector rods and a pair of spaced-apart capacitor plates mounted to the adjacent ends of said rods and facing one another.

17. The mass flow meter according to claim 11 wherein the length-change sensor comprises axially aligned length-change detector rods and a pair of spaced-apart capacitor plates mounted to the adjacent ends of said rods and facing one another.

18. The mass flow meter according to claim 8 wherein the length-change sensor comprises a pair of axially aligned length-change detector rods and a strain gage extending between the adjacent ends of said rods.

19. The mass flow meter according to claim 9 wherein the length-change sensor comprises a pair of axially aligned length-change detector rods and a strain gage extending between the adjacent ends of said rods.

20. The mass flow meter according to claim 10 wherein the length-change sensor comprises a pair of axially aligned length-change detector rods and a strain gage extending between the adjacent ends of said rods.

21. The mass flow meter according to claim 11 wherein the length-change sensor comprises a pair of axially aligned length-change detector rods and a strain gage extending between the adjacent ends of said rods.

22. The mass flow meter according to any one of claims 1 to 4 wherein there are two temperature sensors located near the opposite ends of the measuring pipe.

23. The mass flow meter according claim 22 wherein the length-change sensor comprises at least one strain gage.

24. The mass flow meter according to claim 23 wherein said at least one strain gage is placed on the measuring pipe.

25. The mass flow meter according to claim 23 wherein said at least one strain gage is placed on the carrier pipe.

26. The mass flow meter according to claim 22 wherein each length-change sensor comprises a length-change detector rod.

27. The mass flow meter according to claim 26 wherein said at least one length-change detector rod is of a material with a low thermal expansion coefficient.

28. The mass flow meter according to claim 26 wherein the length-change sensor is located inside the carrier pipe.

29. The mass flow meter according to claim 27 wherein the length-change sensor is located inside the carrier pipe.

30. The mass flow meter according to claim 26 wherein the length-change sensor is located outside the carrier pipe.

31. The mass flow meter according to claim 27 wherein the length-change sensor is located outside the carrier pipe.

32. The mass flow meter according to claim 26 wherein the length-change sensor comprises axially aligned length-change detector rods and a pair or spaced-apart capacitor plates mounted to the adjacent ends of said rods and facing one another.

33. The mass flow meter according to claim 27 wherein the length-change sensor comprises axially aligned length-change detector rods and a pair of spaced-apart capacitor plates mounted to the adjacent ends of said rods and facing one another.

34. The mass flow meter according to claim 28 wherein the length-change sensor comprises axially aligned length-change detector rods and a pair of spaced apart capacitor plates mounted to the adjacent ends of said rods and facing one another.

35. The mass flow meter according to claim 29 wherein the length-change sensor comprises axially aligned length-change detector rods and a pair of spaced-apart capacitor plates mounted to the adjacent ends of said rods and facing one another.

36. The mass flow meter according to claim 30 wherein the length-change sensor comprises axially aligned length-change detector rods and a pair of spaced-apart capacitor plates mounted to the adjacent ends of said rods and facing one another.

37. The mass flow meter according to claim 31 wherein the length-change sensor comprises axially aligned length-change detector rods and a pair of spaced-apart capacitor plates mounted to the adjacent ends of said rod and facing one another..

38. The mass flow meter according to claim 26 wherein the length-change sensor comprises a pair of axially aligned length-change detector rods and a strain gage extending between the adjacent ends of said rods.

39. The mass flow meter according to claim 27 wherein the length-change sensor comprises a pair of axially aligned length-change detector rods and a strain gage extending between the adjacent ends of said rods.

40. The mass flow meter according to claim 28 wherein the length-change sensor comprises a pair of axially aligned length-change detector rods and a strain gage extending between the adjacent ends of said rods.

41. The mass flow meter according to claim 29 wherein the length-change sensor comprises a pair of axially aligned length-change detector rods and a strain gage extending between the adjacent ends of said rods.

42. The mass flow meter according to claim 30 wherein the length-change sensor comprises a pair of axially aligned length-change detector rods and a strain gage extending between the adjacent ends of said rods.

43. The mass flow meter according to claim 31 wherein the length-change sensor comprises a pair of axially aligned length-change detector rods and a strain gage extending between the adjacent ends of said rods.

44. A mass flow meter for flowing media that works on the Coriolis Principle, with a substantially straight measuring pipe carrying the flowing medium, at least one oscillator acting on the measuring pipe, at least one transducer detecting either one or both Coriolis forces and Coriolis oscillations based on Coriolis forces and producing a measuring value of the mass flow, a carrier pipe that holds said measuring pipe, said oscillator and said transducer and two temperature sensors for detecting the temperature of the measuring pipe to correct the measuring value depending on the temperature of the measuring pipe wherein the measuring pipe and the carrier pipe are connected to one another in a way that excludes relative axial movements, and the axial distance between the points connecting the measuring pipe and the carrier pipe corresponds to the oscillation length of the measuring pipe and wherein the two temperature sensors are electrically connected in series whereby only two external connections are required from both temperature sensors.

45. The mass flow meter defined in claim 44 and further including a length-change sensor which detects changes in the oscillation length of the measuring pipe for correcting the measuring valve depending upon the stress on the measuring pipe.

46. The mass flow meter according to claim 45 wherein the length-change sensor comprises at least one strain gage.

47. The mass flow meter according to claim 46 wherein the strain gage is placed on the measuring pipe.

48. The mass flow meter according to claim 46 wherein the strain gage is placed on the carrier pipe.

49. The mass flow meter according to claim 45 wherein the length-change sensor comprises at least one length-change detector rod.

50. The mass flow meter according to claim 49 wherein said at least one length-change detector rod is of a material with a low thermal expansion coefficient.

51. The mass flow meter according to claim 49 wherein the length-change sensor is located inside the carrier pipe.

52. The mass flow meter according to claim 50 wherein the length-change sensor is located inside the carrier pipe.

53. The mass flow meter according to claim 49 wherein the length-change sensor is located outside the carrier pipe.

54. The mass flow meter according to claim 50 wherein the length-change sensor is located outside the carrier pipe.

55. The mass flow meter according to claim 49 wherein the length-change sensor comprises axially aligned length-change detector rods and a pair of spaced-apart capacitor plates mounted to the adjacent ends of said rods and facing one another.

56. The mass flow meter according to claims 50 wherein the length-change sensor comprises axially aligned length-change detector rods and a pair of spaced-apart capacitor plates mounted to the adjacent ends of said rods and facing one another.

57. The mass flow meter according to claim 51 wherein the length-change sensor comprises axially aligned length-change detector rods and a pair of spaced-apart capacitor plates mounted to the adjacent ends of said rods and facing one another.

58. The mass flow meter according to claim 52 wherein the length-change sensor comprises axially aligned length-change detector rods and a pair of spaced-apart capacitor plates mounted to the adjacent ends of said rods and facing one another.

59. The mass flow meter according to claim 53 wherein the length-change sensor comprises axially aligned length-change detector rods and a pair of spaced-apart capacitor plates mounted to the adjacent ends of said rods and facing one another.

60. The mass flow meter according to claim 54 wherein the length-change sensor comprises axially aligned length-change detector rods and a pair of spaced-apart capacitor plates mounted to the adjacent ends of said rod and facing one another.

61. The mass flow meter according to claim 49 wherein the length-change sensor comprises a pair of axially aligned length-change detector rods and a strain gage extending between the adjacent ends of said rods.

62. The mass flow meter according to claim 50 wherein the length-change sensor comprises a pair of axially aligned length-change detector rods and a strain gage extending between the adjacent ends of said rods.

63. The mass flow meter according to claim 51 wherein the length-change sensor comprises a pair of axially aligned length-change detector rods and a strain gage extending between the adjacent ends of said rods.

64. The mass flow meter according to claim 52 wherein the length-change sensor comprises a pair of axially aligned length-change detector rods and a strain gage extending between the adjacent ends of said rods.

65. A mass flow meter according to claim 53 wherein the length-change sensor comprises a pair of axially aligned length-change detector rods and a strain gage extending between the adjacent ends of said rods.

66. A mass flow meter according to claim 54 wherein the length-change sensor comprises a pair of axially aligned length-change detector rods and a strain gage extending between the adjacent ends of said rods.

67. The mass flow meter defined in claim 44 wherein the temperature sensors are temperature-dependent resisters.

68. The mass flow meter defined in claim 44 wherein the temperature sensors are positioned adjacent to the opposite ends of the measuring pipe.

* * * * *